United States Patent
Holub et al.

(10) Patent No.: US 11,080,307 B1
(45) Date of Patent: Aug. 3, 2021

(54) DETECTION OF OUTLIERS IN TEXT RECORDS

(71) Applicant: Rapid7, Inc., Boston, MA (US)

(72) Inventors: Viliam Holub, Prague (CZ); Eoin Shanley, Dublin (IE); Trevor Parsons, Boston, MA (US)

(73) Assignee: Rapid7, Inc.

( * ) Notice: Subject to any disclaimer, the term of this patent is extended or adjusted under 35 U.S.C. 154(b) by 103 days.

(21) Appl. No.: 16/732,171

(22) Filed: Dec. 31, 2019

(51) Int. Cl.
| | | |
|---|---|---|
| *G06F 16/28* | (2019.01) | |
| *G06F 16/23* | (2019.01) | |
| *G06F 16/2457* | (2019.01) | |
| *G06F 16/22* | (2019.01) | |
| *G06F 16/25* | (2019.01) | |

(52) U.S. Cl.
CPC ........ *G06F 16/285* (2019.01); *G06F 16/2255* (2019.01); *G06F 16/2379* (2019.01); *G06F 16/24573* (2019.01); *G06F 16/252* (2019.01)

(58) Field of Classification Search
CPC .... G03F 7/70616; G06F 16/285; G06F 16/35; G06F 16/355
USPC ........................................................ 707/739
See application file for complete search history.

(56) References Cited

U.S. PATENT DOCUMENTS

| | | | |
|---|---|---|---|
| 7,970,772 B2 | 6/2011 | Aggarwal et al. | |
| 8,019,766 B2 | 9/2011 | Chan et al. | |
| 8,554,618 B1* | 10/2013 | Gasch | G06Q 30/0241 705/14.4 |
| 10,042,912 B2 | 8/2018 | Levitan et al. | |
| 2007/0239636 A1 | 10/2007 | Tang et al. | |
| 2009/0324100 A1* | 12/2009 | Kletter | G06F 16/5838 382/217 |
| 2014/0129560 A1* | 5/2014 | Grokop | G06N 20/00 707/737 |
| 2018/0316707 A1 | 11/2018 | Dodson et al. | |
| 2019/0319977 A1* | 10/2019 | Gottschlich | H04L 63/1408 |

* cited by examiner

*Primary Examiner* — Hung T Vy
(74) *Attorney, Agent, or Firm* — Robert C. Kowert; Kowert, Hood, Munyon, Rankin & Goetzel, P.C.

(57) ABSTRACT

Systems and methods are disclosed to implement an outlier detection system for text records. In embodiments, the detection system generates a fingerprint for each incoming record so that similar records map to similar fingerprints. Each record is assigned to a closest cluster in a set of clusters based computed distances between on the record's fingerprint and respective cluster fingerprints of the clusters. The cluster fingerprint is dynamically updated to maintain respective a representative fingerprint of its member records. When a new record is received that is not sufficiently close to any cluster, a new cluster is added to the set for the new record. In embodiments, the creation of the new cluster triggers an alert that the new record is a potential outlier. Advantageously, the disclosed detection system can be used to detect outliers in records in near real time, without the need to pre-specify outlier characteristics.

20 Claims, 10 Drawing Sheets

MANAGE EVENT CLASS 500

EVENT CLASS INFORMATION: 510

CLASS FINGERPRINT: 512    1010 0111 1110 0010 1001 0101 0100 1010 0100 1111

CLASS NAME: 514    STACK OVERFLOW EXCEPTION

FIRST DETECTED: 516    11-11-2018

FREQUENCY: 517    3 OCCURENCES IN LAST 24 HOURS

SERVERITY LEVEL: 518    HIGH

DESCRIPTION: 519    CAUSED BY SESSION MANAGER: RESTART SESSION TO FIX

EVENT CLASS SETTINGS: 520

☒ LOAD CLASS DURING OUTLIER DETECTION 522

☐ DO NOT CHANGE FINGERPRINT 524

☐ DETECTION DISTANCE: 526    6

[ SEE EXAMPLES 530 ]

[ DELETE CLASS 540 ]

SEARCH EVENT RECORDS 600

SEARCH FOR: 610  STACK OVERFLOW EXCEPTION

CLASS FINGERPRINT: 612   1010 0111 1110 0010 1001 0101 0100 1010 0100 1111

☒ CUSTOM SEARCH DISTANCE 614   9

SEARCH PERIOD: 614   11/01/2019   TO   11/10/2019      [ RUN SEARCH 616 ]

SEARCH RESULTS: 620

| EVENT TIME | EVENT TYPE | MACHINE | USER | EVENT DETAILS |
|---|---|---|---|---|
| 11/01/19 03:33:34 pm | STACK OVERFLOW | "123.49.56.78" | "dsmith" | ... |
| 11/01/19 04:00:22 pm | STACK OVERFLOW | "123.49.56.78" | "dsmith" | ... |
| 11/05/19 06:01:50 pm | STACK OVERFLOW | "123.49.56.80" | "tagarwal" | ... |
| 11/09/19 11:31:30 am | STACK OVERFLOW | "123.49.56.72" | "jgarcia" | |

4 RECORD(S) FOUND.

[ VIEW TIME PLOT 630 ]

*FIG. 6*

DETECTION OF OUTLIERS IN TEXT RECORDS

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g. data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security management systems have become increasingly important to protect company networks against these types of vulnerabilities.

Some enterprise security management systems may monitor a company's network by collecting different types of event log data from computing resources in the network and analyzing this data in real time to detect conditions such as security vulnerabilities, network attacks, or network breaches. In many situations, it is desirable to detect outliers (e.g. unusual events) in large streams of event data. Outlier records may indicate important events such as environmental changes, system failures, or security incidents, which may need to be handled immediately. However, real time detection of outliers, particular in text-based data, has remained a challenge for current network monitoring systems. In one regard, monitoring authorities may not know a priori what outlier data will be produced by the network. It is difficult to implement a generalized outlier detection system capable of detecting outlier data that the system had not been specifically programmed to look for.

SUMMARY OF EMBODIMENTS

The systems and methods as described herein may be employed in various combinations and in embodiments to implement an outlier detection system for text records. In embodiments, the detection system generates a fingerprint for each incoming record so that similar records map to similar fingerprints. Each record is assigned to a closest cluster in a set of clusters based on computed distances between the record's fingerprint and respective cluster fingerprint of the clusters. The cluster fingerprints are dynamically updated to maintain respective representative fingerprints of their member records. When a new record is received that is not sufficiently close to any cluster in the set, a new cluster is added to the set for the new record. In embodiments, the creation of the new cluster may trigger an alert that the new record is a possible outlier record. Advantageously, the disclosed detection system can be configured to detect outliers in records in near real time, without the need to pre-specify outlier characteristics.

BRIEF DESCRIPTION OF THE DRAWINGS

FIG. 5 illustrates an example user interface used to view and modify an outlier class in an outlier class library, according to some embodiments.

FIG. 6 illustrates an example user interface used to search for outlier records based on an outlier class, according to some embodiments.

Figure 1:
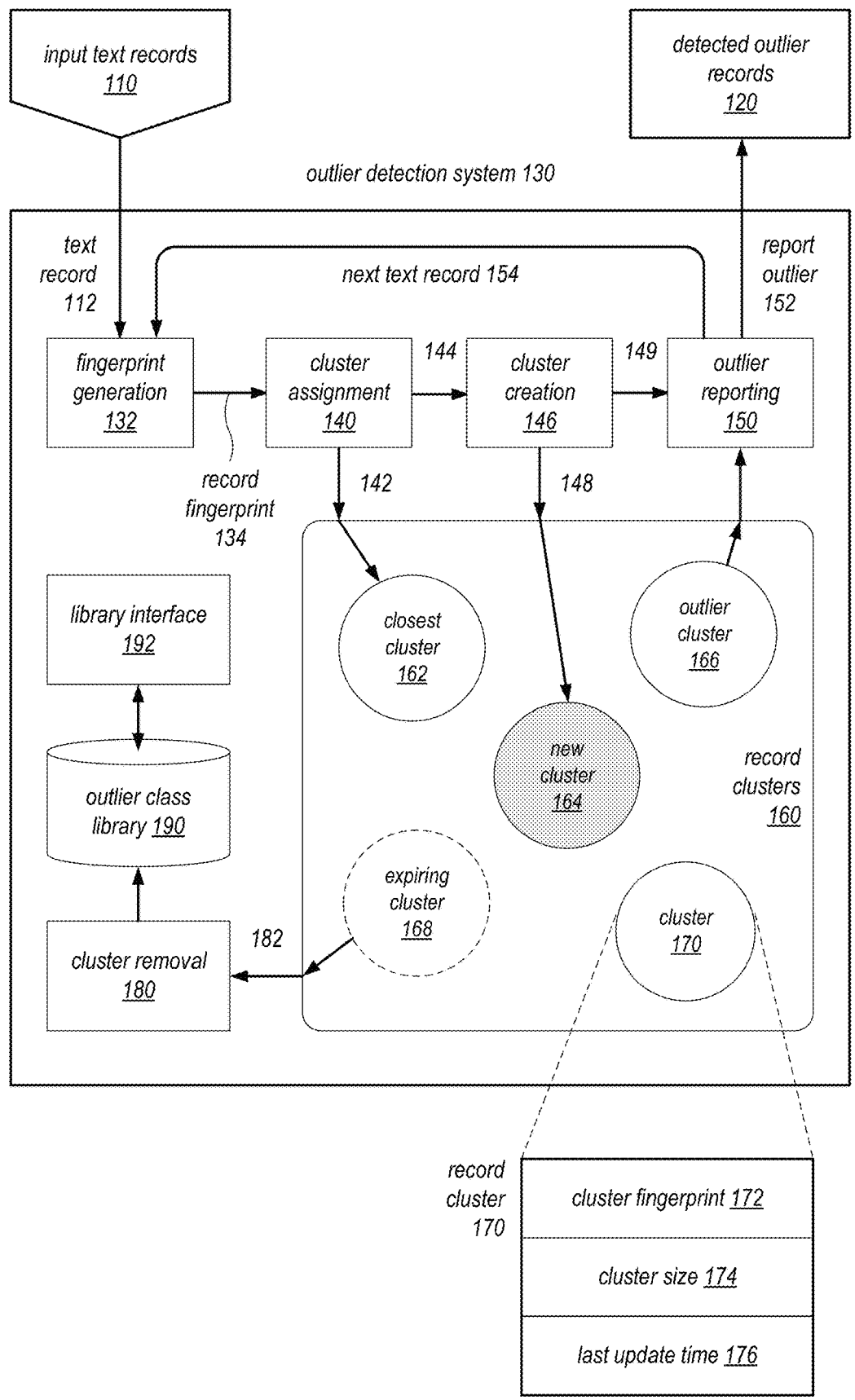
FIG. 1 is a block diagram illustrating an example outlier detection system that can be used to detect outliers in text records in near real time, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Enterprise security management systems may monitor a company's network by collecting different types of event log data from computing resources in the network and analyzing this data in real time to detect conditions such as security vulnerabilities, network attacks, or network breaches. In many situations, it is desirable to detect outliers (e.g. unusual events) in large streams of event data. Outlier records may indicate important events such as environmental changes, system failures, or security incidents, which may need to be handled immediately.

However, real time detection of outliers, particular in text-based data, has remained a challenge for current network monitoring systems. Unlike outliers in numeric data, which may be extracted based on statistical analysis, outliers in text-based data cannot be easily detected based on a set of pre-configured functions. Deep semantic analysis of text data cannot typically be performed in online systems to provide outlier detections in real time. Moreover, in some cases, monitoring authorities may not know a priori what the outlier data will look like. As a result, rule-based detection systems may miss critical outlier events that do not satisfy their detection rules. For example, a rule-based detection system configured to scan for a specific error message may miss similar error messages that did not match the system's pre-specified detection rules.

Accordingly, embodiments of an outlier detection system and technique are disclosed herein, which can be used to detect, identify, and extract outliers in text-based data. The outlier detection system may be implemented as either an online or offline system to detect outliers in a sequence of text records. In some embodiments, the outlier detection system may be configured to issue an alert as soon as a potential outlier record is received. Embodiments of the disclosed outlier detection system do not require extensive knowledge about the underlying text data. Rather, the detection system is able to make its detection decisions based largely on its own observations of received text data. As a result, the disclosed outlier detection system can be used for many different types of data, with little or no manual configuration by the user.

In some embodiments, the outlier detection system operates by grouping received text records into clusters, so that similar records are assigned to the same cluster. An outlier record is detected if it cannot be assigned to already existing cluster or if it is assigned to a small cluster, determined according to an outlier identification criterion. In some embodiments, individual text records are used to generate a fingerprint. The fingerprint may be a vector or bit string of fixed length (e.g. 32 or 64 values or bits), therefore substantially smaller than original event. Two text records are considered similar if their fingerprints are similar according to a distance metric.

The fingerprints may be generated in a variety of ways. In some embodiments, the outlier detection system may first parse a text record into a number of field values or tokens. Field values may be values associated with defined fields in the text records. Tokens may be obtained by separating a text sequence in the record based on delimiters, such as whitespace or punctuation characters, or based on an output of a parser. In some embodiments, the tokens may be individual words or n-grams of multiple words in the text sequence. In some embodiments, certain field values or tokens that are not of interest (e.g., record identifiers, repeated field names or common words such as "the") are removed from the fingerprint generation process. Each field value or token may be converted into a variable-length or fixed-length vector using a set of hash functions. The vectors may be normalized to a range based on a weight of the token. In some embodiments, the vectors are then combined (e.g. summed) to produce a summary vector. The summary vector may then be converted into a bit string of 0s and 1s based on whether the values at each position of the summary vector is negative or positive. In some embodiments, this resulting bit string represents the records' fingerprint.

In some embodiments, the outlier detection system may maintain a set of clusters of the received text records. Each cluster may be associated with a cluster fingerprint, which may be an average of the record fingerprints in each cluster, a media of the record fingerprints in each cluster, or some other type of representative fingerprint. The outlier detection system may assign each incoming text record to a closest cluster in the set, based on computed distances between the record fingerprint and cluster fingerprints. In some embodiments, the computed distance may be a Hamming distance between two bit strings. In some embodiments, the assignment of a record to a cluster will cause the cluster's fingerprint to be dynamically updated. In some embodiments, if a new text record is not sufficiently close to any of the clusters in the set, the detection system will start a new cluster for the new record. For example, a new cluster may be generated if the distance between the new text record and its closest cluster exceeds a specified threshold.

In some embodiments, the detection system will report records in small clusters as outlier records. The reporting or detection criteria may be controlled by configurable parameters. For example, the detection system may be configured to report outliers if a cluster is smaller than a threshold size. In some embodiments, the detection criteria may specify that outliers are reported only after the outlier class has existed for some threshold period of time or failed to gain new member records at a threshold rate. In some embodiments, an outlier notification may be generated whenever a new cluster is created for a new record.

In some embodiments, if an existing cluster in the set has not been updated for a threshold period of time or for a threshold number of records, it will be removed from the active set of clusters used for cluster detection. The periodic removal of clusters from the active set limits the size of the active set. In this manner, the outlier detection system can limit its memory usage and improve its performance.

In some embodiments, removed clusters may be stored in a library as outlier event classes. The library may store these outlier classes with their cluster fingerprints, along with additional metadata such as a user-assigned name, a description, and a priority or severity level of the class, etc. In some embodiments, these stored classes may be matched to similar records seen by the detection system at a later time. In some embodiments, the stored classes may be used to search for similar outlier records stored in a records database. Outlier class searches may be performed on records periodically, for example on a daily or weekly basis, to produce periodic scan reports of identified outlier records.

Depending on the embodiment, detected outlier records may be presented to the user in many different ways. In some embodiments, outlier records may be shown in groups according to their outlier classes. In some embodiments, outlier records may be shown in their natural order (e.g. a chronological order). In some embodiments, the outlier records may be shown graphically. For example, outlier records may be shown in a time plot to highlight when certain types of outlier events occurred.

As may be appreciated by those skilled in the art, embodiments of the outlier detection system described herein provides a number of technical advantages over existing record analysis systems of the state of the art, to improve upon the functioning of these existing systems. In one respect, the disclosed outlier detection system is able to detect outliers in text data as opposed to numerical data. The disclosed system enables this detection by reducing the text records to distinct fingerprints, and using a distance metric among the fingerprints to quantify similarity or dissimilarity among the text records.

In another respect, the disclosed outlier detection process may be implemented as a highly efficient process for execution on a computer system. In particular, the generated fingerprints are typically small in size, and the fingerprint generation and distance computation are relatively simple operations that require only small amounts of compute power and memory. Moreover, the detection process requires only one pass of the text records, and only a modest amount of state (e.g. the clusters) to be carried from one record to the next. Accordingly, the disclosed process can be easily implemented as a lightweight computerized process to detect outliers in near real time.

In another respect, the disclosed outlier detection system does not require the user to pre-specify the characteristics of potential outliers. As discussed, the detection process works by maintaining clusters of commonly-seen records, and reporting records that depart from the clusters of commonly-seen records. Thus, the detection process is not dependent on any pre-specified knowledge or rules about the underlying text data. The disclosed process can be readily applied to any type of text data.

In yet another respect, the outlier classes produced by the outlier detection system may be accumulated in a library for future reference. Outlier classes may be stored with their cluster fingerprints so they can be matched to future occurrences of outlier records. The library may be used to maintain useful information about different types of outlier events and indicate how these events should be handled in the future. These and other features and benefits of the outlier detection system are described in detail below, in connection with the figures.

FIG. 1 is a block diagram illustrating an example outlier detection system that can be used to detect outliers in text records in near real time, according to some embodiments.

As shown, the depicted outlier detection system 130 is configured to accept input text records 110 and produce detected outlier records 120 as output. The input 110 may include a sequence of text records to be scanned for outlier data. In some embodiments, the input text records 110 may be a stream of data received via an interface of the outlier detection system, or stored as data records in a database or log file. In some embodiments, the text records may indicate machine events that were collected from remote machines, which may be sorted according to an event timestamp. Each of the text records 112 may include one or more text data fields that can be used to determine outliers.

As shown, to detect outliers, the outlier detection system 130 may implement a process loop that executes once for each text record 112 in the input text records. In some embodiments, the detection process may be a single-pass process where each text records 112 is examined only once. As shown, the detection process may employ a fingerprint generator component 132 to generate a record fingerprint 134 from the text record 112. The record fingerprint may be a small data structure (e.g. a fixed-length bit string) that is generated from the much larger text record 112. In some embodiments, the fingerprint 134 may be generated in the manner so that similar text records produce similar fingerprints.

In some embodiments, the fingerprint generator 132 may first parse the text record 112 to obtain a number of field names, field values or tokens. For example, some text records may be structured according to a record schema indicating a variable number of fields. These records will be parsed to obtain the individual field names and values. Some text records may include long text sequences that are of variable length. These text records will be parsed to obtain individual tokens (e.g. words or n-grams) within the text sequence.

In some embodiments, field names, field values or tokens will be filtered to remove certain unimportant text values. For example, unimportant record fields such as record ID and timestamp may be removed so that the do not contribute to the record fingerprint 134. Common word tokens such as "of" or "the" may also be removed. Individual field names, field values or tokens may be converted to a fixed-length vector, using a set of hash functions. The vectors may then be combined into a summary vector, for example, by summing corresponding locations of the vectors. The summary vector may then be normalized to account for the varying number of tokens or fields in the record, to limit the value at each vector position to a common range for each record. In some embodiments, this normalization step may generate a bit string, where a 1 is generated for a bit position if a corresponding position in the summary vector is positive, and a 0 is generated for the bit position if the corresponding position in the summary vector is negative. As may be understood, this process produces fingerprints 134 that are fixed length from text records 112 that may have varying numbers of text fields or tokens. The fingerprint 134 reduces the contents of the text record 112 to a small data structure, so as to allow the similarity or dissimilarity of two records to be quantitatively computed.

As shown, the record fingerprint 134 may next be processed by a cluster assignment component 140. The cluster assignor 134 may attempt to assign the text record 112, based on its fingerprint 134, to one of a set 160 or record clusters maintained by the outlier detection system 130. In some embodiments, the cluster set 160 may be implemented in a runtime memory of outlier detection system. The cluster set 160 may maintain a number of clusters of records (e.g. clusters 162, 164, 166, 168, and 170) that are grouped according to their record fingerprints. Accordingly, similar records recently seen by the outlier detection system 130 are assigned to the same cluster, while dissimilar records are assigned to different clusters.

As shown, each cluster in the cluster set 160 may maintain some number of cluster attributes, as shown for cluster 170. Each cluster may maintain a cluster fingerprint 172. In some embodiments, the cluster fingerprint may contain attributes to determine the representative fingerprint of all fingerprints of all records that belong to that cluster, such as a summary and/or average of all the fingerprints of all records that belong to that cluster, or a median fingerprint of the fingerprints in that cluster. Additionally, each cluster may maintain its cluster size 174, which indicates the number of records that have been assigned to the cluster. Moreover, each cluster may maintain a last update time 176, which may be used to determine when the cluster should be expired or retired from the cluster set 160. In some embodiments, each cluster may include further attributes to indicate its current member records. For example, the cluster may indicate a linked list or record IDs, to allow the outlier detection system 130 to quickly find all member records associated with the cluster.

In some embodiments, to assign the text record 112 to a cluster, the cluster assignor 140 will compute the distances (or similarities) between the record fingerprint 134 and the cluster fingerprints 172 of each of the clusters in the cluster set 160. In some embodiments, the distances may be Hamming distances between bit strings. The cluster assignor 140 may determine 142, based on the distances, a closest cluster 162 to the text record 112 (e.g. the cluster a fingerprint having the smallest distance to the record fingerprint). The closest cluster 162 will then be further evaluated to see if it is sufficiently similar to the text record 112.

In some embodiments, the further evaluation may involve comparing the fingerprint distance of closest cluster to a specified distance threshold. The distance threshold may be a configurable parameter that indicates a maximum distance that a record fingerprint can be from the cluster fingerprint in order for an associated record to be assigned to the cluster. Thus, in some cases, even the closest cluster will not be sufficiently close to a record for the record to be assigned to that cluster. In the case that the closest cluster is not sufficiently close to the record 112, the process will proceed 144 to the cluster creation component 146 to create a new cluster 164 for the text record 112. However, if the closest cluster is sufficiently close to the record 112, the record will be assigned to the closest cluster 162.

In some embodiments, the assignment of the text record 112 to the closest cluster 162 will include updating the cluster attributes of that cluster. For example, the cluster fingerprint of the closest cluster 162, which is an average of all member fingerprints, will be updated to incorporate the record fingerprint 134 into the average. In some embodiments, the cluster fingerprint may be an actual fingerprint of a member record that is the closest to the average fingerprint. In some embodiments, the cluster fingerprint may be another type of summary fingerprint or a median fingerprint of the member fingerprints, or determine in other ways. The size of the cluster 162 will be incremented by one. The last update time of the cluster 162 will be updated to reflect the time that the record 112 was assigned to the cluster 162. Accordingly, the clusters in the cluster set 160 may all be dynamically in this fashion. In some embodiments, however, the outlier detection system 130 may configured to operate in a mode where at least some of the clusters in the cluster set 160 are not dynamically updated. For example, certain clusters for common types of records may be configured to be read-only, so that they are used for outlier detection but no longer updated by incoming records.

In the event that a new cluster 164 is to be created for the new text record 112, the cluster creator 146 will create 148 the new cluster 164 in the cluster set 160. The new cluster 164 may have initial cluster attributes that correspond to only the new text record 112. For example, the initial cluster fingerprint of the new cluster 164 may simply be the record finger 134 of the new text record, and the initial cluster size may be one. In this manner, the size of the cluster set 160 may grow dynamically based on new types of text records.

In some embodiments, the new cluster 164 may be loaded from a library 190 of previously seen outlier classes. This library may store previous clusters that have been generated by the outlier detection system 130, but have been since retired from the active cluster set 160. In some embodiments, an old cluster matching in the library 190 matching the new text record 112 may be found by comparing the fingerprint distances between the record fingerprint 134 and the old clusters in the library. The closest matching cluster (or outlier class) in the library may then be loaded into the cluster set 160 for outlier detection.

In some embodiments, the creation 148 of a new cluster 164 may cause 149 an outlier reporter 150 to immediately report 152 the text record 112 as a potential outlier record. Thus, any new text record that cannot be assigned to an existing cluster in the cluster set will generate an outlier record alert or notification. Depending on the embodiment, the alert or notification may be provided via a variety of user interfaces, such as graphical user interfaces (GUIs), programmatic interfaces such as application programming interfaces (APIs) or service interfaces, user interfaces such as email or text interfaces, or the like.

In some embodiments, the creation 148 of the new cluster 164 may not immediately cause an outlier notification 152. Rather, the outlier detection system 130 will simply move on 152 to the next text record in the input 110. In some embodiments, the reporting 152 of outliers will only occur on specified detection conditions or criteria. For example, the detection system may be configured to report outliers when a cluster (e.g. outlier cluster 166) has existed for some specified period of time but only contain less than a threshold number of assigned records. As another example, instead of keeping a cluster size, each cluster may maintain a cluster assignment rate, which may indicate a number of records that have been assigned to the cluster in a recent period of time or for a last number of input records. A low assignment rate may then be used to identifier outlier clusters 166. In some embodiments, outlier cluster identification may occur outside of the text record processing loop, in a separate loop according to its own schedule. In some embodiments, the reporting 152 of outliers may indicate the outlier cluster 166, the member records of the cluster, or both.

In some embodiments, the outlier detection system 130 may implement a cluster removal component 180, which may be configured to periodically remove 182 clusters (e.g. expiring cluster 168) from the cluster set 160. This occasional pruning of clusters from the cluster set 160 reduces memory usage by the outlier detection system 130 and improves the system's execution performance. In some embodiments, clusters in the active set will be retired or expired when a specified expiration criterion is met. For example, in some embodiments, a cluster that has not been assigned to or updated for a threshold amount of time may be retired. This determination may be made for the clusters periodically, using their last update time attribute 176. In some embodiment, other types of expiration policies may be used. For example, a cluster may be retired based on its small size, based on its low assignment rate, or other factors.

In some embodiments, retired or expired clusters 168 may be stored into the outlier class library 190. Newly retired classes may be reviewed by users to determine if it is a new type of outlier class or an occurrence of an existing outlier class seen in the past. Outlier classes stored in the library 190 may be stored with its cluster fingerprint, and well as additional metadata such as a user-provided name, a description, a security or priority level, among other metadata. For example, in a detection system that scans error events, the library 190 may store as one outlier class a particular type of error seen in the past and a description describing possible resolution of that type of error.

In some embodiments, the library 190 may provide a library interface 192, which may allow users to manage the outlier classes stored in the library. The library interface 192 may be provided as a programmatic interface or a user interface, such as a GUI. In some embodiments, library interface 192 may allow users to search for outlier classes based on text records or other outlier classes. In some embodiments, the library interface 192 may allow users or program to access its stored outlier classes to search for outlier text records in an input stream or a records log or repository.

Figure 2:
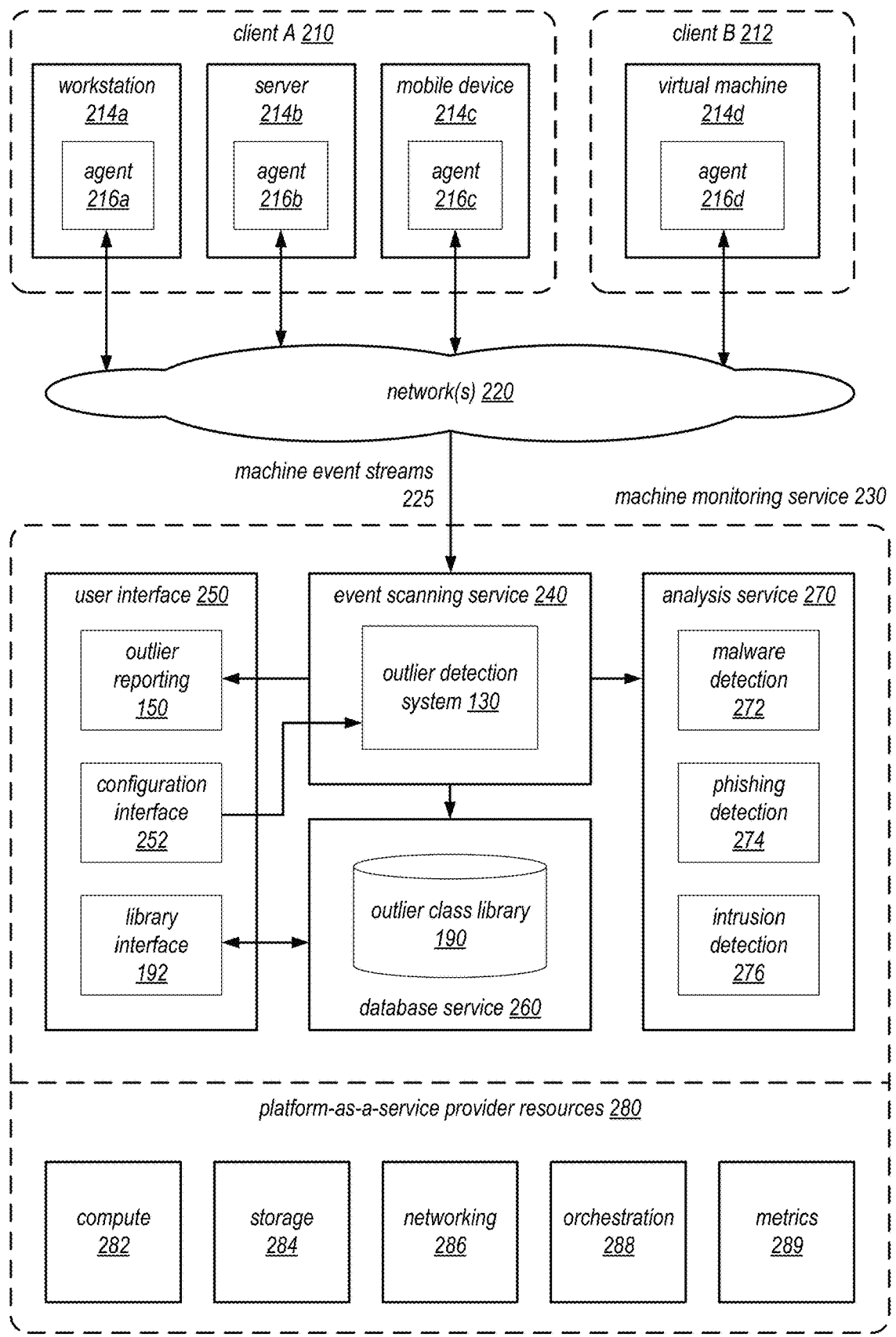
FIG. 2 is a block diagram illustrating a machine monitoring service implemented in a platform-as-a-service provider network that uses an outlier detection system to detect outlier events, according to some embodiments.

FIG. 2 is a block diagram illustrating a machine monitoring service implemented in a platform-as-a-service provider network that uses an outlier detection system to detect outlier events, according to some embodiments.

As shown in FIG. 2, in some embodiments, the outlier detection system 130 of FIG. 1 may be employed in a machine monitoring service 230. In some embodiments, the machine monitoring service 230 may be implemented in the cloud and within a platform-as-a-service (PaaS) provider network. As shown, the machine monitoring service 230 may be configured to communicate with many agents 216a-d deployed on remote machines 214a-d over one or more networks 220. In some embodiments, the agents may be configured to collect or generate machine events 225 about the remote machines, and transmit the machine events to the machine monitoring service 230. In some embodiments, the machine monitoring service 230 may be configured to receive machine events from many different clients (e.g. different entities, companies, organizations, groups, geographic locations, networks, etc.), and perform remote monitoring of the computing resources of these different clients. In some embodiments, distinct clients 210 and 212 may be associated with a different user account of the machine monitoring service 230.

As shown, the clients in this example may operate different types of computing resources, such as a workstation 214a, a server 214b, a mobile device 214c, and a virtual machine 214d. The virtual machine 214d may be an instance of an emulated computer and operating system that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment may be a container, which provides a portable and isolated execution environment over a host operating system of a physical host. Example implementations of container technologies include DOCKER, GOOGLE KUBERNETES, AMAZON WEB SERVICES, and MICROSOFT AZURE. Depending on the embodiment, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to establish communications between the agents 216 and the machine monitoring service 230. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, accounting software, firewall/security software, etc.) for establishing networking links between the remote machines 214 and the machine monitoring service 230. In some embodiments, the agents 216 may transmit the machine events 225 to the machine monitoring service 230 over the network 220 using secure communication channels such as transport layer security (TLS) connections.

As shown in this example, the machine monitoring service 230 is implemented as a number of services 240, 250, 260, and 270, hosted within a PaaS service provider network. The agents 216 and other clients of the machine monitoring service 230 may convey services requests to and receive responses from PaaS provider network via network 220. In some embodiments, the service request and responses may be web services requests and responses and formatted as JSON documents. The machine assessment service 230 may support REST-style or document-based (e.g., SOAP-based) types of web services requests. In some embodiments, the machine assessment service 230 may implement service interfaces using other types of remote procedure calling protocols, such as CORBA, GOOGLE PROTOCOL BUFFERS or PROTOBUF. The PaaS provider network may provide the hardware and/or software needed to implement service endpoints, such that a request directed to that endpoint is properly received and processed.

As shown, the PaaS provider network may provide different types of computing resources 280, which can be leased by service customers to implement custom hosted services. As shown, the PaaS provider may provide resource services such as compute resource service 282, storage resource service 284, networking resources service 286, orchestration service 288, and resource metrics service 289. The services of the machine monitoring service 230 may be built using these underlying resource services provided by the PaaS provider. In some embodiments, the PaaS resources 280 may implement features such as load balancing of incoming service requests and/or dynamic management and scaling of service node pools. In some embodiments, each of the services 240, 250, 260, and 270 may be implemented using a pool of service nodes provided by the PaaS provider, which may be individual instances of virtual machines. In some embodiments, the PaaS provider may be a provider such as AMAZON WEB SERVICES or MICROSOFT AZURE.

In some embodiments, the machine monitoring service 230 may be configured to monitor, analyze, and take action on security-related incidents that are detected on the remote machines 214 or entire remote company networks. For example, the machine monitoring service 230 may be configured to monitor user emails to detect phishing attempts. As another example, the service may monitor machine processes or machine event logs to detect the presence of malware. As another example, the service may monitor user activity on remote machines to detect suspicious activity. As another example, the service may monitor inbound connections or password attempts to detect attempted attacks, compromised credentials, or network intrusions.

Additionally, in some embodiments, the machine monitoring service 230 may host machine event data received about the remote machines and allow clients to view, analyze, and receive alerts and/or reports about the event data. For example, the service may allow users to run queries about the collected events for their machines. As another example, the service may provide sophisticated analysis and reporting capabilities to provide users information about their networks. As another example, the service may generate alerts to network owners when a security breach is detected. Depending on the embodiment, the machine monitoring service 230 may be configured to provide a variety of other types of monitoring, analysis, and reporting functions for its clients.

As shown, in some embodiments, monitored machines events 225 may be routinely scanned by an event scanning service 240. The event scanning service 240 may be configured to scan for problematic events (e.g. unusual events or error conditions), and report these events to the analysis service 270 for further analysis. For example, the reported events may include outlier events (e.g. outlier text records 152) detected using the outlier detection system 130. The various components of the analysis service 270 may then examine these outlier event records to perform more targeted analysis or detection. For example, the malware detection module 272 may examine outlier events to detect a machine process that loaded a malware executable. As another example, a phishing detection module 274 may use outlier events to detect phishing attacks using new or unusual email addresses, web addresses, or email content.

As yet another example, an intrusion detection module 276 may use outlier events to detect unusual communication patterns or attacker packet signatures. In some embodiments, these conditions may cause the analysis service 270 to generate alerts or notifications, or perform mitigation actions.

As shown, the outlier class library 190 may be hosted in a database service 260, which may be one of the services provided by the PaaS service provider network. In some embodiments, the database service 260 may be a multi-tenant database service that can host database instances for many clients of the PaaS network. In some embodiments, the database service 260 may manage the underlying resources used by each hosted database, so that the database can be automatically scaled based on its current request or data usage levels. The database service may implement a Structured Query Language (SQL) access interface, or another type of query language or access interface.

As shown, the machine monitoring service 230 may implement a set of user interfaces 250, which may be implemented as GUIs or web interfaces viewable using a web browser. In some embodiments, these user interfaces 250 may be implemented by client-side applications. As shown, the user interfaces may include the outlier reporting interface 150. For the example, the outlier reporting interface 150 may be configured to present detected outlier machine events according to their outlier clusters, or in a chronological order (e.g. in a time plot). In some embodiments, the outlier reporting interface 150 may be include a notification mechanism, such as via email, to alert users of detected outlier events.

In some embodiments, the user interfaces 250 may also implement a configuration interface 252. The configuration interface 252 may be used to configure various aspects of the machine monitoring service 230, including aspects of the outlier detection system 130. For example, the configuration interface 252 may be used to specify parameters that control how fingerprints are generated for individual text records, including how particular fields and/or tokens are treated, and different weights that may be applied to particular field values or tokens. The outlier detection system may be configured to ignore certain unimportant field values or tokens, while applying additional weigh to increase the influence of certain other field values or tokens to the fingerprint. As another example, the configuration interface 252 may be used to configure the threshold distance for adding new clusters. As additional examples, the configuration interface 252 may be used to configure when outlier records are reported, and also the expiration criteria for removing clusters from the active cluster set.

In some embodiments, the user interfaces 250 may also implement the library interface 192. As shown, the library interface 192 may be used to provide access to the outlier class library 190. In some embodiments, the library interface 192 may be provided at least in part by the database service 260. In some embodiments, the library interface 192 may provide customer user or programmatic interfaces specifically for the outlier class library 190. For example, the library interface 192 may allow users or programs to manage and update the outlier classes stored in the library. As another example, the library interface 192 may allow users or programs to search for an outlier class for a particular event, or a set of outlier events given a particular outlier class.

Figure 3:
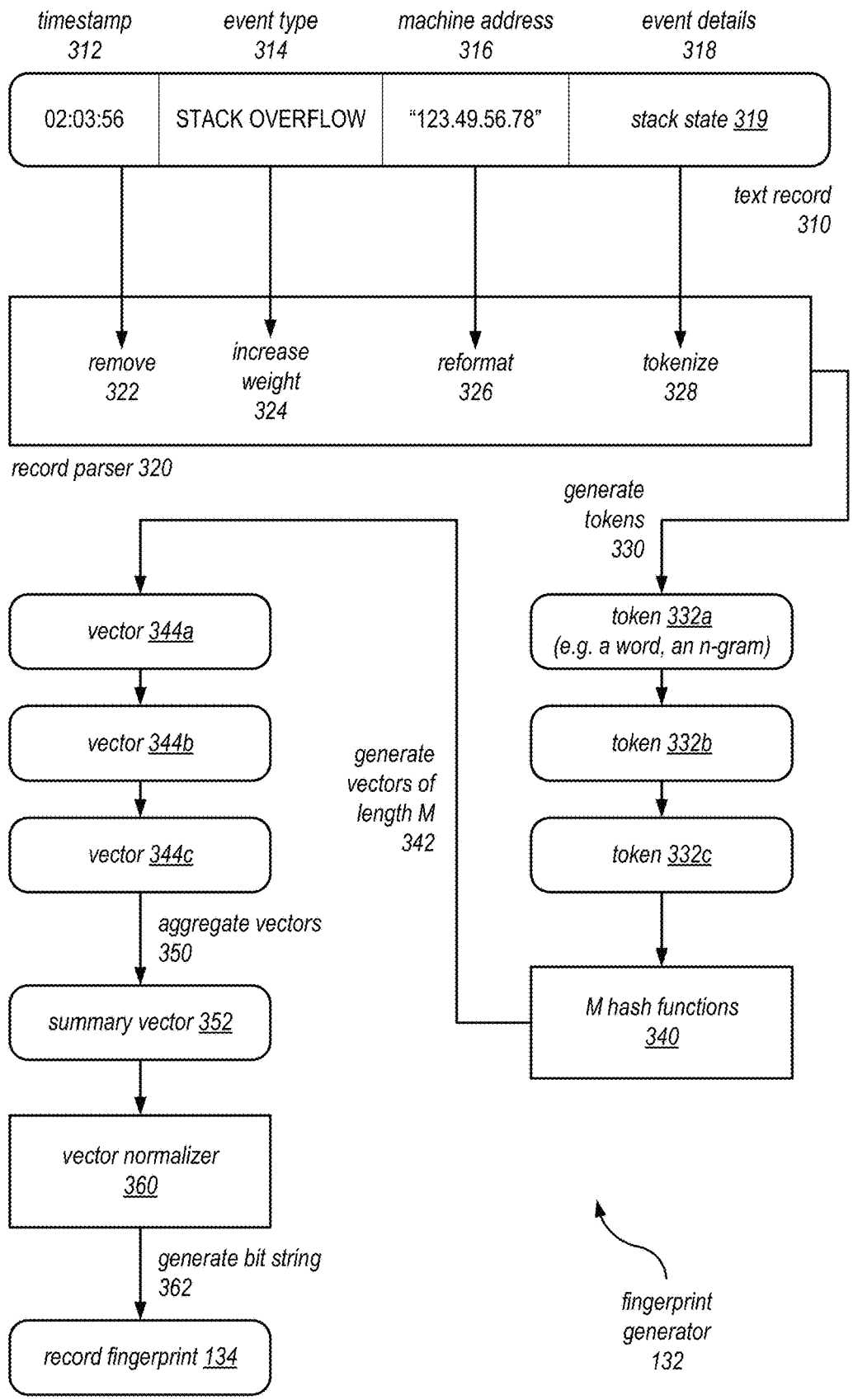
FIG. 3 illustrates components and operations of a fingerprint generator that generates fingerprints for text records in an outlier detection system, according to some embodiments.

FIG. 3 illustrates components and operations of a fingerprint generator that generates fingerprints for text records in an outlier detection system, according to some embodiments. As shown, the components and operations in this example may be used in the fingerprint generator 132, as discussed in connection with FIG. 1.

As shown, a text record 310 is converted into a record fingerprint 134, as discussed in connection with FIG. 1. The text record 310 in this example includes four record fields: a timestamp 312, an event type 314, a machine address 316, and event details 318. In this example, the fingerprint generation process first parses the record 310 into its constituent fields, using the record parser 320, to generate 330 a series of tokens 332.

In some embodiments, the record parser 320 may be configured to perform certain processing for each individual field name, field value or token obtained from the record. For example, record parsers 320 may remove 322 a field name and value such as the record timestamp 312 from the fingerprint generation process, because it is an unimportant field in determining the similarity or dissimilarity of records. As another example, a particular field value (e.g. the event type 314) may be given extra weight 324, in order to increase its contribution to the ultimate fingerprint 134. In some embodiments, the weight may be applied at the parsing stage by generating extra copies of the field value or token. In some embodiments, the weight may be applied at a later stage of the fingerprint generation by, for example, increasing the magnitude of values in the vectors 344 used to represent the field values or tokens. Additionally, some field values (e.g. machine address 316) may be reformatted or transformed 326 to remove extraneous data such as quotation marks or escape characters.

In some embodiments, variable length field values such as event details 318 may be tokenized 328 into a series of text tokens 322. In some embodiments, each text token 332 may be an individual word (e.g. delimited in the text sequence by whitespace characters and/or punctuation marks or an output of a parser) or n-grams of multiple words or tokens. The tokens 332 are later aggregated or combined to create a summary vector 352. In this manner, text records or fields of variable length (e.g. any number of field names, field values or tokens) may be reduced to fingerprint data structures of the same length. In some embodiments, the influence of particular tokens may be increased using token weights. In some embodiments, tokens generated from one field may be aggregated separately from tokens generate from another field, in order to normalize the number of tokens in each field. In some embodiments, the behavior of the record parser 320 may be configurable by the user, for example, using the configuration interface of 252 of FIG. 2.

As shown, the generated tokens 332 may then be individually hashed using a set of hash functions 340. In some embodiments, the outlier detection system may be configured to vary the set of hash functions, and hash functions that were used to produce a fingerprint may be stored within the fingerprint. Each of the M hash functions in the set may be applied to a token 332 to produce a particular hash value for at a particular position of a vector of length M. Accordingly, each token 332 is used to generate 342 one vector of hash values.

As shown, the resulting vectors 334 may then be aggregated 350 to produce a summary vector 352, which may also be of length M. In some embodiments, the summary vector 352 may be produces by summing each of the token vectors 344 (e.g. by iteratively adding individual components of the token vectors 344 to corresponding components of the summary vector 352). In some embodiments, field summary vectors may be generated and normalized for each field in the text record 310, and these field summary vectors may be aggregated again to produce the record summary vector. In some embodiments, any weights for individual fields or tokens may be applied at this stage, for example, by multiplying individual token vectors 344 by the determined weight.

As shown, the summary vector 352 may then be normalized using a vector normalizer component 360, to generate 362 a bit string, which will in this example serve as the record fingerprint 134. As may be understood, different text records may have different number of fields or tokens, which will result in summary vectors that vary widely in magnitude. The normalization step is performed to reduce the summary vector 352 for all text records to a common range, so that they can be fairly compared for similarity or dissimilarity. In some embodiments, the bit string will be generated by assigning one bit value to positive components in the summary vector 352, and the other bit value to negative components in the summary vector. As may be understood, this described fingerprint generation process may be used for any type of text record. However, as discussed, the user may in some embodiments specifically configure the manner in which fingerprints are generated for specific types of text records.

Figure 4A:
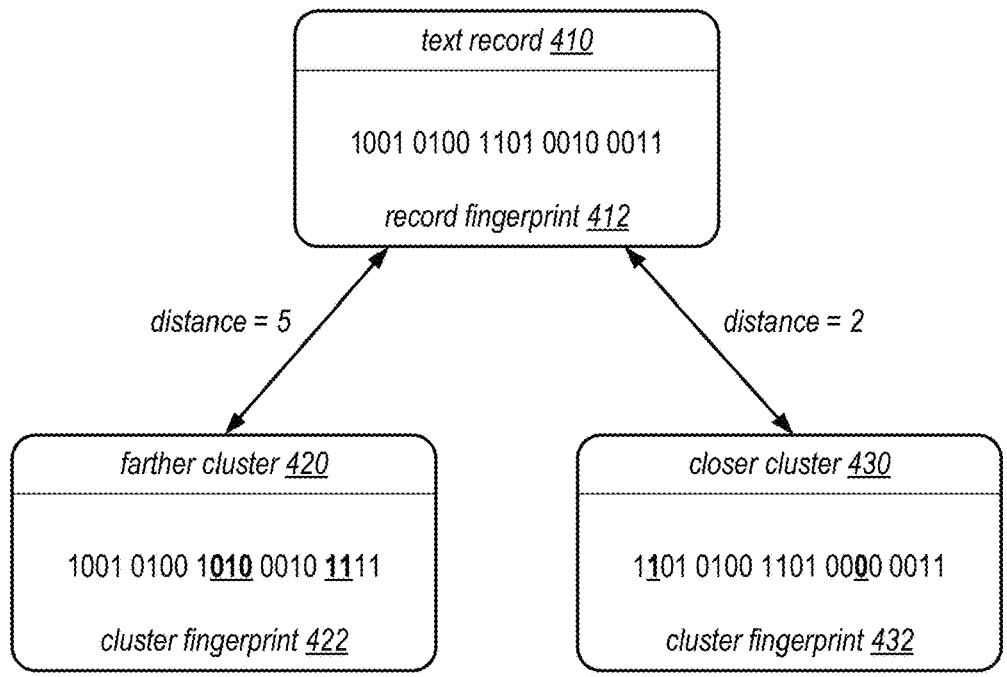
FIG. 4A illustrates the computation of a distance metric between record and cluster fingerprints, according to some embodiments.

FIG. 4A illustrates the computation of a distance metric between record and cluster fingerprints, according to some embodiments. In some embodiments, the illustrated distance computation may be used by the cluster assignment component 140, as discussed in connection with FIG. 1.

As shown in this example, a text record 410 is associated with a record fingerprint 412, which is a bit string of 20 bits. Additional two clusters 420 and 430 are associated with respective cluster fingerprints 422 and 432, which are also bit strings of length 20. The distance from the record fingerprint 412 and the two cluster fingerprints 422 and 432 may be computed as the Hamming distance between the respective bit strings. The Hamming distance may indicate a count of bits are that different between two bit strings. In this example, the Hamming distance from record fingerprint 412 to cluster fingerprint 422 is 5, and the Hamming distance from record fingerprint 412 to cluster fingerprint 432 is 2. Thus, of the two clusters, cluster 430 is the closer or more similar cluster to the text record 410. It is noted that in other embodiments, other types of distance or similarity metrics may also be used.

Figure 4B:
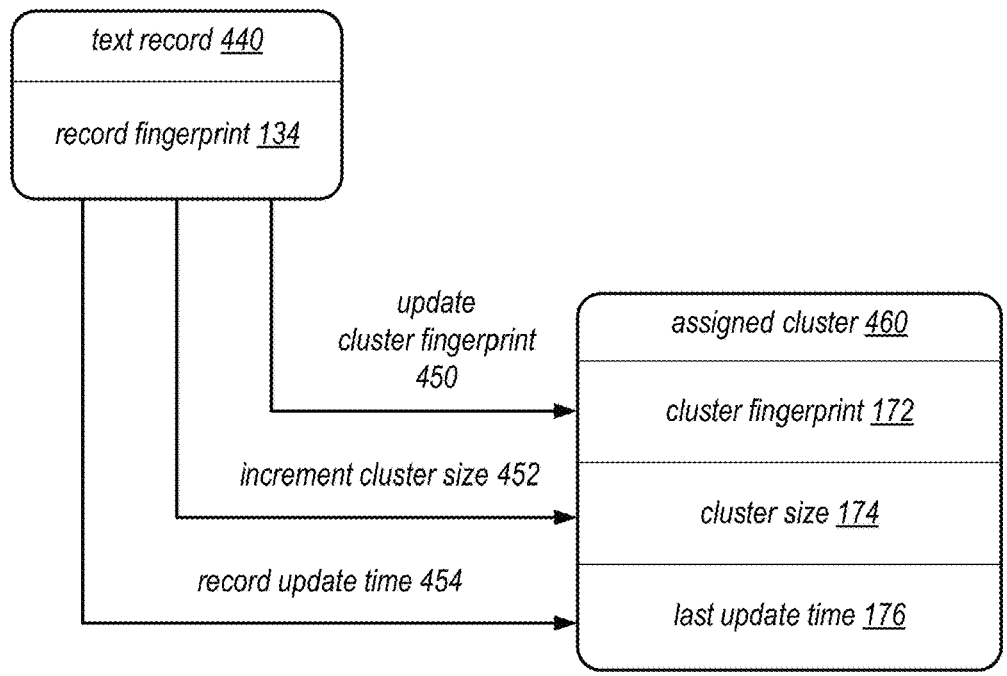
FIG. 4B illustrates updates to a cluster when a text record is assigned to the cluster, according to some embodiments.

FIG. 4B illustrates updates to a cluster when a text record is assigned to the cluster, according to some embodiments. In some embodiments, the illustrated update operations may be used by the cluster assignment component 140, as discussed in connection with FIG. 1.

As shown in this example, the text record 440 is being assigned to an assigned cluster 460. As discussed, the assignment may include updating a number of cluster attributes of the assigned cluster 460. For example, the record fingerprint 134 of the text record may be used to update 450 the cluster fingerprint 172 of the assigned cluster. In some embodiments, each cluster may maintain a sum of all memory records assigned to the cluster, so that a new record fingerprint can be easily averaged into the cluster fingerprint using the cluster size 174. In some embodiments, the cluster fingerprint 172 may be another type of representative fingerprint for the member records in the cluster, such as a summary fingerprint or a median fingerprint of the member records. As shown, the cluster size 174 of the assigned cluster may be incremented 452 to account for the new text record 440. As discussed, this cluster size 174 may be used by the outlier detection system to determine whether the cluster is an outlier cluster, or whether the cluster should be retired. As shown, the last update time 176 of the assigned cluster may also be updated to record the time that the new text record 440 is added to the cluster. In some embodiments, this attribute may also be used to determine whether the cluster is an outlier cluster or should be retired. As discussed, in some embodiments, these determinations may be made based on other tracked parameters, such as the age of the cluster, the assignment rate of the cluster, among other factors.

FIG. 5 illustrates an example user interface used to view and modify an outlier class in an outlier class library, according to some embodiments. In some embodiments, the user interface 500 shown in the figure may be a part of the library interface 192 of FIG. 1.

As shown, the event class management interface 500 is a graphical user interface that allows a user to view and modify certain aspects of an outlier class. The event class shown may have been generated as an outlier cluster by the outlier detection system 130 and stored in the outlier class library 190. In some embodiments, this GUI may be provided as a web interface, which may be provided as a webpage by a web server and displayed on a web browser.

As shown, the GUI 500 provides an event class information section 510 that displays various metadata information about the event class. Certain information may be generated by the outlier detection system 130, while other information may be subsequently added by a user. In this example, metadata fields that are indicated in bold are those that can be modified by the user. The class fingerprint 512 may be the cluster fingerprint that is generated for the event class. The first detected date 516 and detection frequency 517 may be metadata that is automatically provided by the outlier detection system. Other metadata such as the event class name 514, severity level 518, and description 519 may be metadata that were added by the user. Some of this metadata information may be helpful in the future in handling new occurrences of this type of event.

As shown in this example, the GUI 500 also provides an event class settings section 520, which specifies different parameters for controlling how the event class will be used by the outlier detection system in the future. In some embodiments, a setting such as setting 522 may instruct the outlier detection system to load a previously-seen event class in the library as a cluster for current outlier detection. In some embodiments, this loading may be triggered by a match of an event class in the event class library to a new outlier record. In this manner, new occurrence of outlier records in this class will be automatically associated with the existing event class. As shown, in some embodiments, the GUI 500 may include other controls to specify whether the event class (e.g. its class fingerprint) should be updated by the outlier detection system (control 524), and a custom detection distance to be used for the event class (control 526).

As shown, the GUI 500 also includes a button 530 to allow the user to search for examples of the event class. For example, the button 530 may initiate a search for event records that match the event class in a records repository or log. The GUI 500 in this example also provides a button 540 to allow the user to delete the event class from the library.

FIG. 6 illustrates an example user interface used to search for outlier records based on an outlier class, according to some embodiments. In some embodiments, the user interface 500 shown in the figure may be a part of the library interface 192 of FIG. 1.

As shown, the search event records GUI 600 allows users to search for event records that match a particular event class. In this example, section 610 in the GUI allows the user to select an event class by name, and display the class fingerprint 612 of the selected class. In some embodiments, the search may be performed over a repository or log of event records using the fingerprints of those records and the class fingerprint 612 of the event class. In some embodiments, respective similarity of distance metrics may be computed for each event record, and those that are within a specified distance or similarity tolerance (e.g. the customer search distance 614) will be returned as search results. In this example, the GUI 600 also allows the users to specify a search period 614, which constrains the time period for the event records to be searched.

As shown, results of the search are shown in section 620. In this example, the matching event records are shown in chronological order. In some embodiments, the returned event records may be organized in different manner, for example, grouped by matching event classes. In this example, the GUI also provides a button 630, which allows the user to visualize the returned event records in a time plot.

Figure 7:
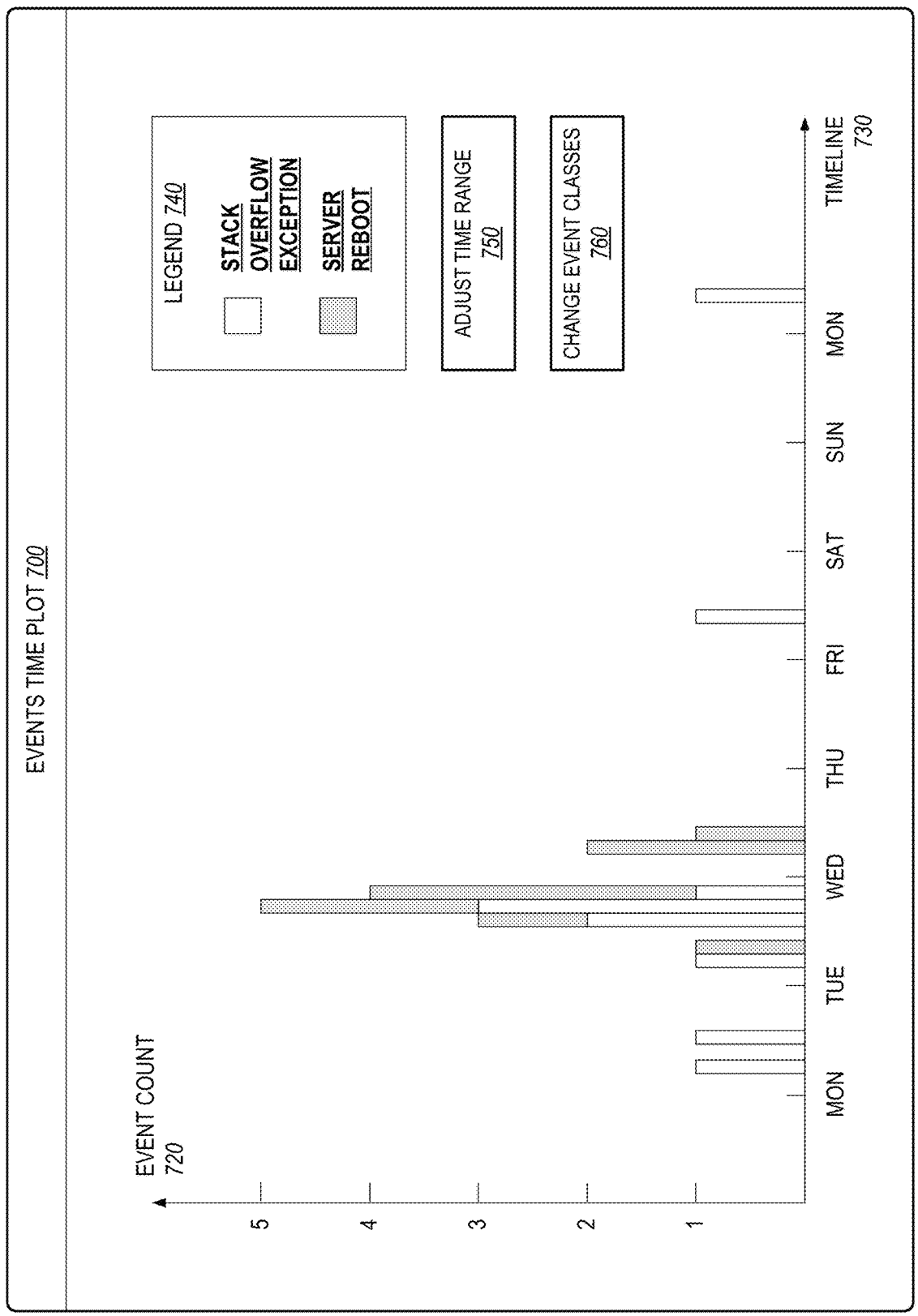
FIG. 7 illustrates an example user interface used to view outlier records in a time plot, according to some embodiments.

FIG. 7 illustrates an example user interface used to view outlier records in a time plot, according to some embodiments. In some embodiments, the user interface 500 shown in the figure may be a part of the library interface 192 of FIG. 1.

As shown, the events time plot GUI 700 displays events that match certain event class classes in a time plot. In this example, events from two event classes are displayed, as indicated by the legend 740. The time plot in this example displays a count 720 of the number of events of each indicated type that were seen in a timeline 730 of a particular time period. The event classes that are included in the time plot may be changed via button 760, and the time range for the time plot may be changed via button 750. User interfaces such as GUI 700 allow users to easily observe time patterns that underlie particular types of unusual events and relationships that may exists between different types of events. In some embodiments, the information shown in the time plot are extracted using queries submitted via the library interface 192 of FIG. 1, and the queries are carried out by searching for fingerprint matches in a large volume the event records against the class fingerprints of specified event classes.

Figure 8:
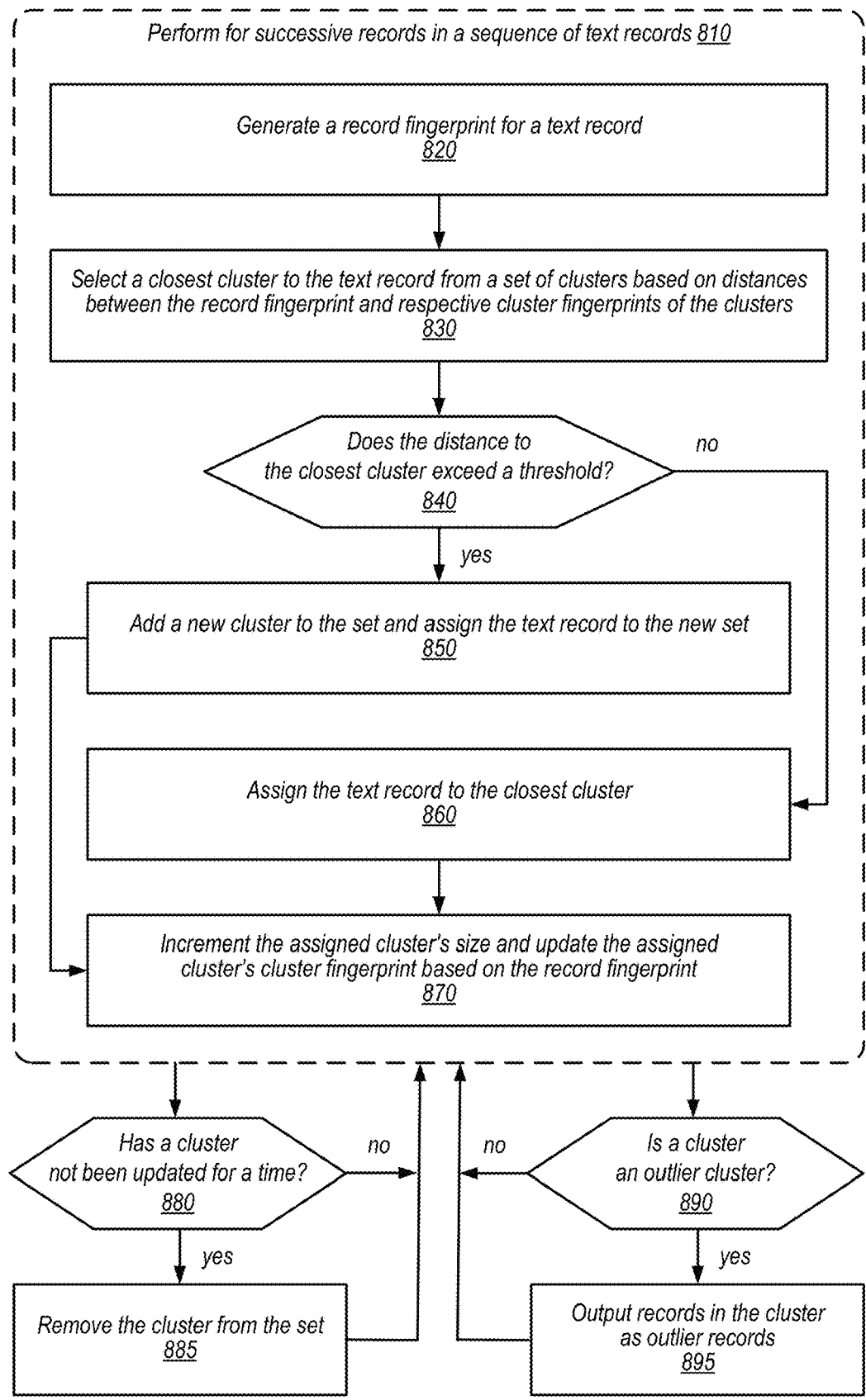
FIG. 8 is a flowchart illustrating aspects of an outlier detection process performed by an outlier detection system, according to some embodiments.

FIG. 8 is a flowchart illustrating aspects of an outlier detection process performed by an outlier detection system, according to some embodiments. In some embodiments, the process shown in the figure may be performed by the outlier detection system 130, as discussed in connection with FIG. 1.

As shown, operations 820, 830, 840, 850, 860, and 870 are performed in this example in a process loop 810, which is performed for each successive record in a sequence of text records. In some embodiments, the sequence of text records may be received as a stream by the outlier detection system. In some embodiments, the text records may be fetched from a record repository such as a database or a record log. In some embodiments, the outlier detection system is configured to examiner each record in a single pass, and detect any outlier records in the sequence of text records in near real time.

At operation 820, a record fingerprint is generated for a text record. The record fingerprint may be a small data structure that is generated for each text record to allow the text record to be assigned to a cluster, based on its similarity with the cluster. In some embodiments, the text record may be parsed or tokenized into a number of field names, field values and/or tokens. Based on user configuration, some field names, field values or tokens may be removed, while other field names, field values or tokens may be emphasized applying weight values. In some embodiments, individual field names, field values or tokens may be reduced to vectors using a set of hash values. The vectors may be aggregated to produce a single summary vector for the text record, and the summary vector may be normalized for the number of tokens or field names and values in the record. In some embodiments, the resulting record fingerprint may be a bit string generated as discussed in connection with FIG. 3. In some embodiments, aspects of the fingerprint generation process may be configurable by the user.

At operation 830, a closest cluster is selected for the text records from a set of clusters maintained by the outlier detection system. The set of clusters (e.g. the cluster set 160 of FIG. 1) may be maintained in a runtime memory of a computer system executing the outlier detection system. Each cluster may maintain a cluster fingerprint in the same form as the record fingerprint that represent an average of the member records of that cluster. In some embodiments, the cluster fingerprint may be another type of summary fingerprint or a median fingerprint of the member records of the cluster. In some embodiments, the selection may be performed by computing respective distance or similarity metrics between the record fingerprint and the cluster fingerprints of each of the clusters, in a manner as discussed in connection with FIG. 4A. In some embodiments, the distance metric employed may be the Hamming distance between two fingerprints. The selected cluster will be the closest cluster having the smallest distance to the record.

At operation 840, a determination is made whether the distance to the closest cluster exceeds a distance threshold. The distance threshold may be a user specified parameter that controls when a new text record considered an outlier record (e.g., not sufficiently close to any of the existing clusters in the active cluster set). If the distance to the closest cluster does exceed the threshold, the process proceeds to operation 850. If the distance does not exceed the threshold, the process proceeds to operation 860.

At operation 850, if the distance exceeds the threshold, a new cluster is added to the detection system's cluster set. The new cluster may be generated according to the text record, and may use the text record's record signature as the cluster's initial cluster signature. The text record is then assigned to this new cluster as its sole member. At operation 860, if the distance does not exceed the threshold, the text records is simply assigned to the closet cluster.

In either case of operation 850 or 860, the process proceeds to 870 to update the assigned class of the text record. The update may increment the size of the assigned cluster by one. The update may also update the assigned cluster's cluster fingerprint to incorporate the text record's record fingerprint. In some embodiments, the cluster fingerprint will be updated to reflect a newly computed representative fingerprint of the cluster's member records. In some embodiments, the update of the assigned cluster may be performed in similar fashion as discussed in connection with FIG. 4B. The process then loops back to operation 820 for the next text record in the text sequence.

As shown, the depicted process may also include operations 880 and 885, which illustrate a subprocess to periodically remove clusters from the active cluster set. At operation 880, a determination is made whether a cluster in the active cluster set has been updated for a threshold period of time. This determination may represent a check of an expiration criterion for the clusters. In some embodiments, clusters may be expired or retired to reduce the number of clusters that are retained in memory by the outlier detection system, so as to reduce memory usage by the system and improve execution performance. If the cluster has been updated during the period of time, subprocess will simply take no action. However, if the cluster has not been updated for the threshold period of time, the subprocess will proceed to operation 885 to remove the cluster from the active set. It will be noted that depending on the embodiment, the removal of clusters may be governed by a variety of different conditions and factors. As some examples, a cluster may be removed based on its age, its size, its assignment rate, or a combination of these factors.

As shown, the depicted process also includes operations 890 and 895, which illustrate a subprocess to periodically report outliers based on the clusters. In some embodiments, outliers may be reported immediately when a new cluster is created at operation 850. In some embodiments, outliers may be reported outside of the process loop 810, according to a different outlier detection criterion and at a different reporting schedule. At operation 890, a determination is made whether a current cluster in the active set represents an outlier cluster. In some embodiments, this determination may be made based on a user-configurable policy. For example, a class may be determined to be an outlier class based on its age, its size, its assignment rate, the last time that a record was assigned to the cluster, or a combination of these factors. If a cluster is not determined to be an outlier cluster, the subprocess takes no action. However, if a cluster is determined to be an outlier cluster, the subprocess proceeds to operation 895, where all records in the outlier cluster are reported as outlier records. The reporting of outliers may involve generating a notification or an alert, or updating a user interface. The reporting may be carried out by the outlier reporting interface 150, as discussed in connection with FIG. 1.

Figure 9:
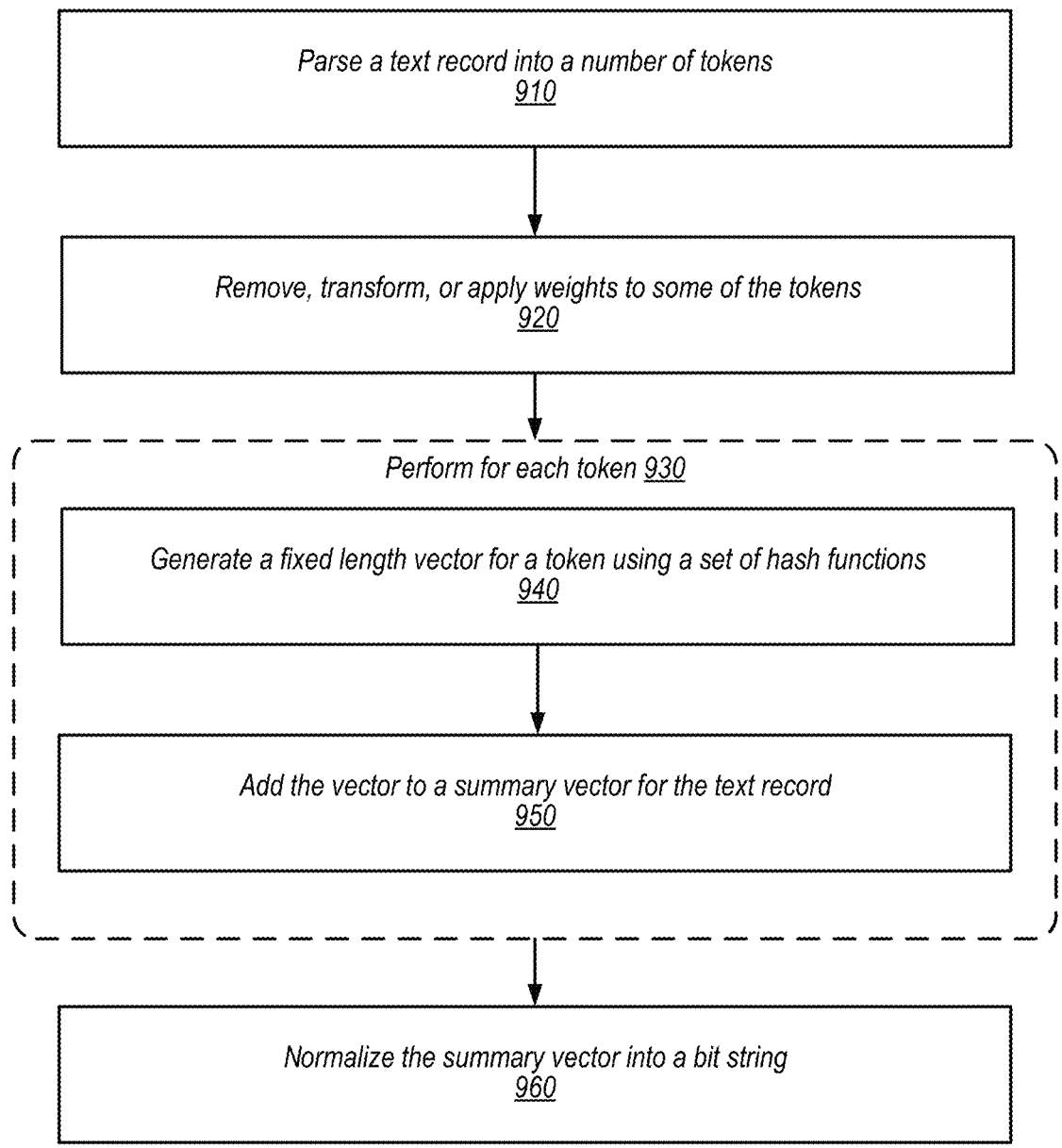
FIG. 9 is a flowchart illustrating aspects of a process to generate fingerprints for text records in an outlier detection system, according to some embodiments.

FIG. 9 is a flowchart illustrating aspects of a process to generate fingerprints for text records in an outlier detection system, according to some embodiments. In some embodiments, the process shown in the figure may be performed by the fingerprint generation module 132 of FIG. 1, and in a similar fashion as discussed in connection with FIG. 3.

The process beings at operation 910, where a text records is parsed into a number of tokens. In some embodiments, the tokens may be text values in distinct fields of the text record. In some embodiments, the tokens may be obtained by tokenizing a text sequence based on token delimiters. For example, the tokens may be individual words that are obtained by tokenizing a text sequence using whitespace and punctuation characters as delimiters, or running a parser. In some embodiments, individual tokens may include n-grams of multiple tokens or words. In some embodiments, a text records may be parsed first according to its fields, and again within each field to obtain individual words within the fields.

At operation 920, some of the tokens may be removed, transformed, applied with weights. In some embodiments, multiple tokens may be merged or combined into a single token. In some embodiments, a token (such as a record ID or record timestamp) may be removed because they are not useful to determine the similarity or dissimilarity of two records. In some embodiments, some tokens may be processed to remove extraneous formatting such as quotes, escape characters, etc. In some embodiments, weights may be applied to certain field values or tokens that are particularly important in distinguishing between text records. These actions may be performed on the tokens according to parsing rules specified by the user.

As shown, operations 940 and 950 are a pair of operations that are performed for each token generated from the text record. At operation 940, a fixed length vector is generated for the token using a set of hash functions. In some embodiments, variable length vectors may also be used. Each hash function may produce a hash value for a particular position in the vector. In some embodiments, if a weight is to be applied to the token, the weight may be applied at this stage by causing the hash functions to map to a large result space according to the weight. For example, a weighted token vector may include hash values that are 10 times larger than an unweighted token vector. At operation 950, each token vector is added to a summary vector of the same length. The summary vector may be added to iteratively for each token vector.

At operation 960, after all token vectors have been added to the summary vector, the summary vector is normalized to produce a bit string. The normalization step will normalize the magnitude of the components in the summary vector, so that text records having a large number of tokens will not be necessarily seen as very dissimilar from text records with only a few tokens. In some embodiments, the normalization will assign a value of 1 to a bit location if a corresponding position of the summary vector contains a positive value, and a 0 to a bit location if the corresponding position contains a negative value. In some embodiments, this bit string is the fingerprint for the text record.

Figure 10:
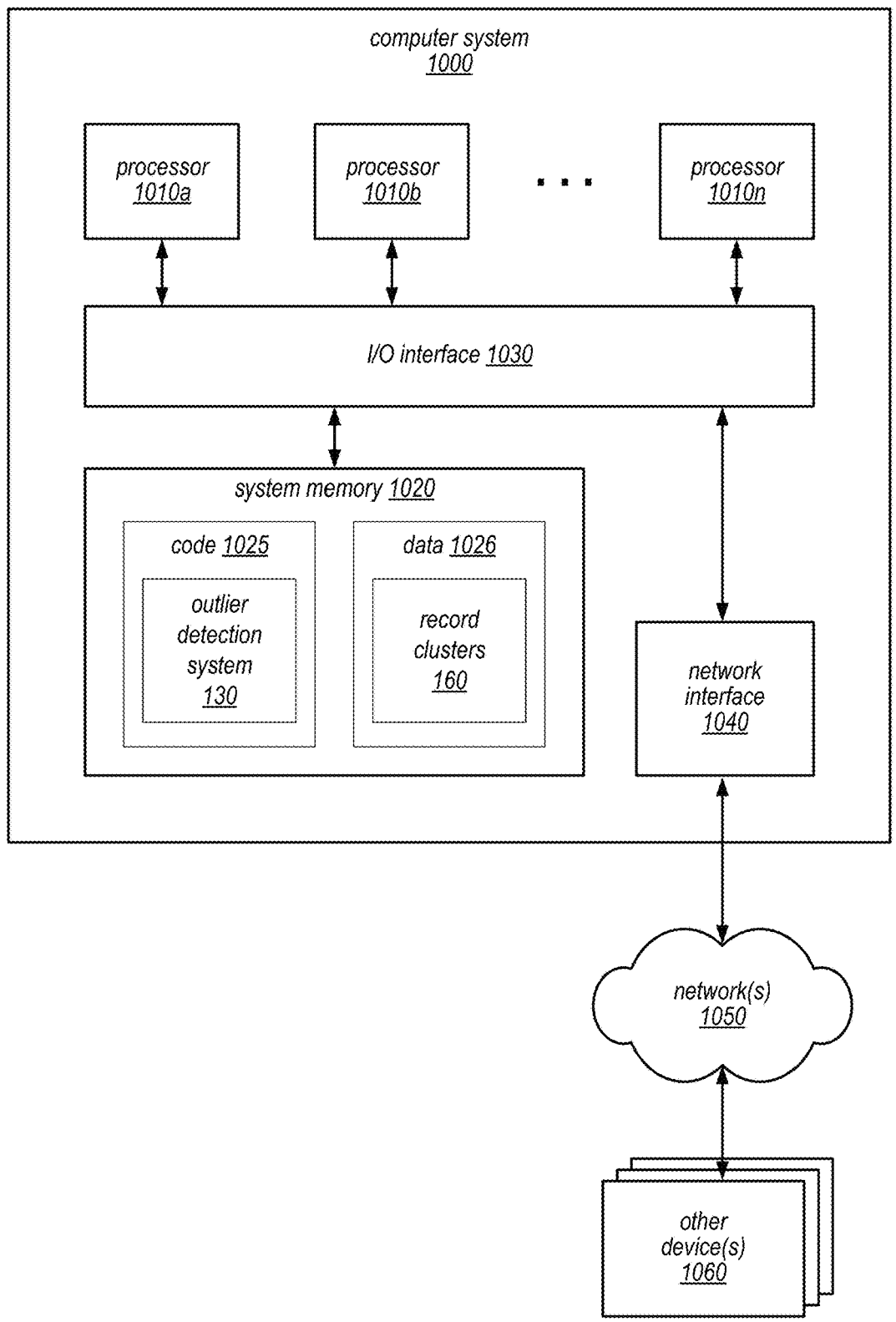
FIG. 10 is a block diagram illustrating an example computer system that can be used to implement one or more portions of an outlier detection system, according to some embodiments.

FIG. 10 is a block diagram illustrating an example computer system that can be used to implement one or more portions of an outlier detection system, according to some embodiments. For example, the computer system 1000 may be a server that implements one or more components of the outlier detection system 130 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, these some of these other devices may be implemented locally on the computer system 1000, accessible via the I/O interface 1030.

In various embodiments, persistent storage devices may include to disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement executable modules of the outlier detection system 130, as discussed. The system memory 1020 may also be used to store data 1026 needed by the executable instructions. For example, the in-memory data 1026 may include portions of the set of record clusters 160, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A method comprising:
  performing, by one or more hardware processors with associated memory, a detection of one or more outlier records in a sequence of text records, including:
    processing successive text records in the sequence, wherein the processing includes:
      generating a record fingerprint for a text record;
      selecting, from a set of one or more clusters, a closest cluster to the text record, wherein each cluster in the set is associated with a respective cluster fingerprint, and the selection based at least in part on respective distances between the record fingerprint and one or more respective cluster fingerprints of the one or more clusters;
      if the distance does not exceed a distance threshold, assigning the text record to the closest cluster as the text record's assigned cluster;
      if the distance exceeds the distance threshold, assigning the text record to a new cluster as the text record's assigned cluster and adding the new cluster to the set;
      incrementing a size of the assigned cluster;
      updating the assigned cluster's cluster fingerprint based at least in part on the text record's record fingerprint; and
    based at least in part on the processing of the sequence of text records:
      determining at least one cluster in the set as an outlier cluster based at least in part on a respective size of the at least one cluster; and
      providing an output indicating one or more text records assigned to the outlier cluster as detected outlier records.

2. The method of claim 1, wherein the generating of the record fingerprint for the text record comprises:
  parsing the text record to obtain text values from a plurality of text fields in the text record, wherein the parsing includes one or more of:
    removing a particular text value of a particular text field;
    applying a weight to a particular text value of a particular text field;

transforming a particular text value of a particular text field; and generating the record fingerprint from the obtained text values.

3. The method of claim 1, wherein the text records in the sequence include text records with variable numbers of tokens, and the generating of the record fingerprint comprises:

parsing the text record into a plurality of tokens;

for individual ones of the plurality of tokens:

generating a variable-length or fixed-length vector for the token, wherein values in the vector are produced using a set of hash functions applied to the token; and adding the vector to a summary vector for the text record; and normalizing the summary vector into a bit string.

4. The method of claim 3, wherein the normalizing of the summary vector into a bit string comprises:

for each value in the summary vector, assigning a bit value in the bit string based on whether the value is positive or negative.

5. The method of claim 3, wherein parsing of the text record into tokens comprises:

determining individual words in the text record; and parsing the text record into individual tokens that include multiple ones of the words.

6. The method of claim 1, wherein the updating of the assigned cluster's cluster fingerprint comprises:

determining a representative fingerprint of record fingerprints for all text records assigned to the assigned cluster, including the text record; and setting assigned cluster's cluster fingerprint to the representative fingerprint.

7. The method of claim 1, wherein the record fingerprint of the text record and the cluster fingerprint of the closest cluster are bit strings of a same length, and the processing of the text record comprises:

determining a Hamming distance of the two bit strings as the distance between the record fingerprint and the cluster fingerprint.

8. A system, comprising:

one or more hardware processors with associated memory that implement an outlier detection system in text records, configured to:

process successive text records in a sequence, to:

generate a record fingerprint for a text record;

select, from a set of one or more clusters, a closest cluster to the text record, wherein each cluster in the set is associated with a respective cluster fingerprint, and the selection based at least in part on respective distances between the record fingerprint and one or more respective cluster fingerprints of the one or more clusters;

if the distance does not exceed a distance threshold, assign the text record to the closest cluster as the text record's assigned cluster;

if the distance exceeds the distance threshold, assign the text record to a new cluster as the text record's assigned cluster and add the new cluster to the set;

increment a size of the assigned cluster;

update the assigned cluster's cluster fingerprint based at least in part on the text record's record fingerprint; and based at least in part on the processing of the sequence of text records:

determine at least one cluster in the set as an outlier cluster based at least in part on a respective size of the at least one cluster; and provide an output indicating one or more text records assigned to the outlier cluster as detected outlier records.

9. The system of claim 8, wherein the outlier detection system is configured to:

monitor a plurality of streams of event records indicating events on a plurality of remote machines, wherein the sequence of text records is received as one of the plurality of streams; and in response to assigning the text record to the new cluster, generate an alert indicating the text record as a potential outlier record.

10. The system of claim 8, wherein the outlier detection system is configured to:

in response to a determination that no text records have been assigned to the new cluster for the threshold period of time or a threshold number of text records, remove the new cluster from the set of clusters.

11. The system of claim 8, wherein the one or more outlier records have associated timestamps, and to the output indicating one or more text records as detected outlier records, the outlier detection system is configured to:

update a graphical user interface (GUI) to display the detected outlier records in a time plot according to their respective timestamps.

12. The system of claim 8, wherein the outlier detection system is configured to:

provide a configuration interface to receive one or more configuration parameters that control the generation of record fingerprints of text records.

13. The system of claim 8, wherein:

the outlier detection system includes a database configured to store outlier classes corresponding to outlier clusters previously generated by the outlier detection system; and the outlier detection system is configured to add the a particular cluster in the cluster set to the database as an outlier class.

14. The system of claim 13, wherein the outlier detection system is configured to:

provide a user interface to modify metadata associated with the outlier class in the database, including one or more of:

a name for the outlier class, a severity level for the outlier class, and a description of the outlier class.

15. The system of claim 8, wherein the outlier detection is configured to:

provide a user interface to search for text records, configured to:

receive a search request indicating an outlier class associated with a particular cluster fingerprint;

determine one or more text records associated with one or more respective record fingerprints, wherein one or more respective distances between the one or more respective record fingerprints and the cluster fingerprint are below a search distance threshold; and return search results for the search request indicating the one or more text records.

16. One or more non-transitory computer-accessible storage media storing program instructions that when executed on or across one or more processors implement at least a portion of an outlier detection system and cause the outlier detection system to:

process successive text records in a sequence, to:
  generate a record fingerprint for a text record;
  select, from a set of one or more clusters, a closest cluster to the text record, wherein each cluster in the set is associated with a respective cluster fingerprint, and the selection based at least in part on respective distances between the record fingerprint and one or more respective cluster fingerprints of the one or more clusters;
  if the distance does not exceed a distance threshold, assign the text record to the closest cluster as the text record's assigned cluster;
  if the distance exceeds the distance threshold, assign the text record to a new cluster as the text record's assigned cluster and add the new cluster to the set;
  increment a size of the assigned cluster;
  update the assigned cluster's cluster fingerprint based at least in part on the text record's record fingerprint; and
based at least in part on the processing of the sequence of text records:
  determine at least one cluster in the set as an outlier cluster based at least in part on a respective size of the at least one cluster; and
  provide an output indicating one or more text records assigned to the outlier cluster as detected outlier records.

17. The one or more non-transitory computer-accessible storage media of claim 16, wherein the text records in the sequence include text records with variable numbers of tokens, and to generate of the record fingerprint for the text record, the program instructions when executed on or across the one or more processors cause the outlier detection system to:
  parse the text record into a plurality of tokens;
  for individual ones of the plurality of tokens:
    generate a vector for the token, wherein values in the vector are produced using a set of hash functions applied to the token; and
    add the vector to a summary vector for the plurality of tokens; and
  after adding respective vectors of the tokens to the summary vector, normalize the summary vector into a bit string.

18. The one or more non-transitory computer-accessible storage media of claim 16, wherein the program instructions when executed on or across the one or more processors cause the outlier detection system to:
  receive the sequence of text records as a streams of event records indicating monitored events on one or more remote machines; and
  in response to assigning the text record to the new cluster, generate a notification indicating the text record as a potential outlier record.

19. The one or more non-transitory computer-accessible storage media of claim 16, wherein the program instructions when executed on or across the one or more processors cause the outlier detection system to:
  in response to a determination that a particular cluster in the set has not been updated for the threshold period of time or a threshold number of text records, remove the particular cluster from the set of clusters.

20. The one or more non-transitory computer-accessible storage media of claim 19, wherein:
  the outlier detection system includes a database configured to store outlier classes corresponding to outlier clusters previously generated by the outlier detection system; and
  the program instructions when executed on or across the one or more processors cause the outlier detection system to add the particular cluster to the database as an outlier class.

* * * * *